(12) United States Patent
Lee et al.

(10) Patent No.: US 8,218,629 B2
(45) Date of Patent: Jul. 10, 2012

(54) ENCODING AND/OR DECODING SYSTEM, MEDIUM, AND METHOD WITH SPATIAL PREDICTION AND SPATIAL PREDICTION COMPENSATION OF IMAGE DATA

(75) Inventors: Sang-jo Lee, Suwon-si (KR); Woo-shik Kim, Yongin-si (KR); Si-hwa Lee, Seoul (KR); Do-hyung Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1351 days.

(21) Appl. No.: 11/783,873

(22) Filed: Apr. 12, 2007

(65) Prior Publication Data
US 2007/0253483 A1    Nov. 1, 2007

(30) Foreign Application Priority Data
Apr. 13, 2006  (KR) .................. 10-2006-0033582

(51) Int. Cl.
*H04N 7/12* (2006.01)
(52) U.S. Cl. ............ 375/240.12; 375/240.29
(58) Field of Classification Search ......... 375/240.12–240.17, 240.29
See application file for complete search history.

(56) References Cited

U.S. PATENT DOCUMENTS

| | | | |
|---|---|---|---|
| 2002/0163490 A1* | 11/2002 | Nose ................ | 345/89 |
| 2003/0053086 A1* | 3/2003 | Chen et al. .......... | 358/1.9 |
| 2004/0008771 A1 | 1/2004 | Karczewicz | |
| 2004/0126030 A1 | 7/2004 | Lin et al. | |
| 2004/0136458 A1 | 7/2004 | Dahlhoff et al. | |
| 2006/0203913 A1* | 9/2006 | Kim et al. ........... | 375/240.16 |

FOREIGN PATENT DOCUMENTS

| | | |
|---|---|---|
| CN | 1565130 | 1/2005 |
| JP | 09-247681 | 9/1997 |
| JP | 2000-023163 | 1/2000 |
| JP | 2004-140473 | 5/2004 |
| JP | 2004-304724 | 10/2004 |
| JP | 2005-005844 | 1/2005 |
| JP | 2005-341567 | 12/2005 |
| JP | 2006-005438 | 1/2006 |
| KR | 10-2002-0057526 | 7/2002 |
| KR | 10-2004-0062651 | 7/2004 |

(Continued)

OTHER PUBLICATIONS

Taiwanese Office Action issued Aug. 23, 2010 in corresponding Taiwanese Patent Application 096113073.

(Continued)

*Primary Examiner* — Gilberto Barron, Jr.
*Assistant Examiner* — Malcolm Cribbs
(74) *Attorney, Agent, or Firm* — Staas & Halsey LLP

(57) ABSTRACT

An encoding and/or decoding system, medium, and method with spatial prediction and spatial prediction compensation. The system may include a spatial prediction unit that spatially predicts pixel values of a current block of an image using neighboring blocks in a row immediately above the current block among neighboring blocks that are spatially adjacent to the current block. The spatial prediction unit performs spatial prediction using replaced pixel values of neighboring blocks in a row immediately above the current block every predetermined row unit, with the pixel values of neighboring blocks in a row immediately above the current block every predetermined row unit being replaced with a predetermined reference value.

44 Claims, 14 Drawing Sheets

FOREIGN PATENT DOCUMENTS

| KR | 10-2005-0109525 | 11/2005 |
|---|---|---|
| KR | 10-2006-0080438 | 7/2006 |

OTHER PUBLICATIONS

Chinese Patent Office Action issued Jan. 8, 2010 corresponds to Chinese Patent Application 200710095833.0.

Japanese Office Action issued Mar. 23, 2010 corresponds to Japanese Patent Application 2007-104073.

Japanese Office Action issued Jul. 13, 2010 in corresponding Japanese Patent Application 2007-104073.

Zhang Nan et al., "Spatial Predication Based Intra-coding", 2004 IEEE International Conference on Multimedia and Expo (ICME)—Jun. 27-30, 2004, Taipei, Taiwan, IEEE—Piscataway, NJ USA Lnkd., vol. 1 Jun. 27, 2004, pp. 97-100.

Marta Karczewicz et al., Nokia MVC H.26L Proposal Description, Joint Video Team (JVT) of ISO/IEC MPEG & ITU-T VCEG(ISO/IEC JTC1/SC29/WG11 and ITU-T SG16 Q6), No. 15jI9, May 10, 2000 pp. 37-48.

Tambankar A et al., An Overview of H. 264/MPEG-4 part 10, Eurasip Conference Focused on Video/Image Processing and Multimedia communications, vol. 1, Jul. 2-5, 2003, pp. 1-51.

Sato K et al., "Consideration on Intra Predication for Pipeline Processing in H.264/MPEG-4 AVC", Proceedings of Spie Photonics for Solar Energy Systems, Spie, PO Box 10 Bellingham WA 98227-0010 USA LNKD. Vil. 5558, Jan. 1, 2004, pp. 485-494.

Yoichi Yagasaki et Al., "Pipeline Issue for Intra Predication", Joint Video Team (JVT) of ISO/IEC MPEG and ITU-T VCEG (ISO/IEC JTC1/SC29/WG11 and ITU-T SG16 Q6), No. JVT-E160, Oct. 18, 2002.

Extended European Search Report issued Jun. 28, 2010, corresponds to European Patent Application No. 07104959.7.

Japanese Office Action issued Oct. 11, 2011 in considering Japanese Patent Application 2007-104073.

\* cited by examiner (a)

(b)

FIRST GROUP
SECOND GROUP
THIRD GROUP
FOURTH GROUP
FIFTH GROUP
SIXTH GROUP

ENCODING AND/OR DECODING SYSTEM, MEDIUM, AND METHOD WITH SPATIAL PREDICTION AND SPATIAL PREDICTION COMPENSATION OF IMAGE DATA

CROSS-REFERENCE TO RELATED APPLICATIONS

This application claims the benefit of Korean Patent Application No. 10-2006-0033582, filed on Apr. 13, 2006, in the Korean Intellectual Property Office, the disclosure of which is incorporated herein in its entirety by reference.

BACKGROUND OF THE INVENTION

1. Field of the Invention

One or more embodiments of the present invention relate to encoding and/or decoding of image data, and more particularly, to an encoding and/or decoding system, medium, and method with spatial prediction and spatial prediction compensation.

2. Description of the Related Art

Conventionally, spatial prediction is required to encode image data. For example, intra spatial predictive encoding is a technique for predicting pixel values of a current block using spatial correlation of an image. To be more specific, the pixel values of the current block are predicted using a differential value of decoded pixel values of blocks that are adjacent to the current block and correlated with the pixel values of the current block.

FIG. 1 illustrates eight examples (①-⑧) for eight respective prediction directions for conventional spatial prediction. Referring to FIG. 1, pixel values of a row immediately above or on the left side of a current block are used to perform the spatial prediction in various directions.

However, since the conventional spatial prediction is performed using pixel values of blocks on the left of the current block, it becomes impossible to perform real time spatial prediction and encoding.

FIG. 2 illustrates a pipeline processing that cannot use such a conventional spatial prediction using pixel values of a row immediately above or on the left side of a current blocks. Pipeline processing is a technique for performing the spatial prediction of the current block immediately after performing the spatial prediction of a previous block. Here, in conventional Pipeline processing, the spatial prediction of the current block using pixel values of blocks on the left of the current block can only be performed by using pixel values of decoded blocks adjacent to the current block after performing the spatial prediction, transform and quantization, inverse quantization and inverse transform, and spatial prediction compensation of blocks adjacent to the current block. As illustrated in FIG. 2, the above mentioned conventional spatial processing is illustrated as not being possible in the illustrated conventional Pipeline processing. Thus, such conventional spatial processing can not be performed using pixel values of blocks on the left of the current block. Such a pipeline processing failure results in similar failures of a real time encoding and decoding of image data, resulting in encoding and decoding delays.

Moreover, if an error is generated during the spatial prediction of an image having edges, the spatial prediction will be performed based on the error, causing error diffusion and display quality degradation.

SUMMARY OF THE INVENTION

One or more embodiments of the present invention provide a system, medium, and method for spatial prediction of image data, to achieve real time encoding and prevent error diffusion.

One or more embodiments of the present invention also provide a system, medium, and method with encoding image data, to achieve real time encoding and prevent error diffusion.

One or more embodiments of the present invention also provide a system, medium, and method with spatial prediction compensation of image data, to make it possible to perform real time prediction compensation on image data that is encoded in real time.

One or more embodiments of the present invention also provides a system, medium, and method decoding image data, to make it possible to perform real time decoding on image data that is encoded in real time.

Additional aspects and/or advantages of the invention will be set forth in part in the description which follows and, in part, will be apparent from the description, or may be learned by practice of the invention.

To achieve the above and/or other aspects and advantages, embodiments of the present invention include a system with spatial prediction of image data, the system including a spatial prediction unit to spatially predict pixel values of a current block of an image using neighboring blocks in a row immediately above the current block among neighboring blocks that are spatially adjacent to the current block, wherein the spatial prediction is based on a replacing of pixel values of neighboring blocks in respective rows immediately above a respective current block every predetermined row unit within the respective current block with respective predetermined reference values.

To achieve the above and/or other aspects and advantages, embodiments of the present invention include a system for encoding image data, the system including a spatial prediction unit to spatially predict pixel values of a current block of an image using neighboring blocks in a row immediately above the current block among neighboring blocks that are spatially adjacent to the current block, a transformation and quantization unit to transform and quantize the spatially predicted pixel values, and a bitstream generation unit to generate a bitstream corresponding to the transformed and quantized pixel values, wherein the spatial prediction unit performs spatial prediction based on a replacing of pixel values of neighboring blocks in respective rows immediately above a respective current block every predetermined row unit within the respective current block with respective predetermined reference values.

To achieve the above and/or other aspects and advantages, embodiments of the present invention include a system for spatial prediction compensation of image data, the system including a spatial prediction compensation unit to compensate for spatially predicted pixel values according to the spatially predicted pixel values having been spatially predicted using neighboring blocks in a row immediately above the current block, among neighboring blocks that are spatially adjacent to the current block, based on a replacing of pixel values of neighboring blocks in respective rows immediately above a respective current block in every predetermined row unit within the respective current block with respective predetermined reference values.

To achieve the above and/or other aspects and advantages, embodiments of the present invention include a system for decoding image data, the system including a bitstream decoding unit to decode a bitstream of the image data, an inverse quantization and inverse transformation unit to inversely quantize and inversely transform the decoded bitstream, and a spatial prediction compensation unit to compensate for spatially predicted pixel values, of the inversely quantized and inversely transformed decoded bitstream, according to the spatially predicted pixel values having been spatially predicted using neighboring blocks in a row immediately above the current block, among neighboring blocks that are spatially adjacent to the current block, based on a replacing of pixel values of neighboring blocks in respective rows immediately above a respective current block in every predetermined row unit within the respective current block with respective predetermined reference values.

To achieve the above and/or other aspects and advantages, embodiments of the present invention include a method of spatial prediction of image data, the method including spatially predicting pixel values of a current block of an image using neighboring blocks in a row immediately above the current block among neighboring blocks that are spatially adjacent to the current block, wherein the spatial prediction is based on a replacing of pixel values of neighboring blocks in respective rows immediately above a respective current block every predetermined row unit within the respective current block with respective predetermined reference values.

To achieve the above and/or other aspects and advantages, embodiments of the present invention include a method of encoding image data, the method including spatially predicting pixel values of a current block of an image using neighboring blocks in a row immediately above the current block among neighboring blocks that are spatially adjacent to the current block, transforming and quantizing the spatially predicted pixel values, and generating a bitstream corresponding to the transformed and quantized pixel values, wherein the spatial prediction is based on a replacing of pixel values of neighboring blocks in respective rows immediately above a respective current block every predetermined row unit within the respective current block with respective predetermined reference values.

To achieve the above and/or other aspects and advantages, embodiments of the present invention include a method of spatial prediction compensation of image data, the method including compensating for spatially predicted pixel values according to the spatially predicted pixel values having been spatially predicted using neighboring blocks in a row immediately above the current block, among neighboring blocks that are spatially adjacent to the current block, based on a replacing of pixel values of neighboring blocks in respective rows immediately above a respective current block in every predetermined row unit within the respective current block with respective predetermined reference values.

To achieve the above and/or other aspects and advantages, embodiments of the present invention include a method of decoding image data, the method including decoding a bitstream of the image data, inversely quantizing and inversely transforming the decoded bitstream, and compensating for spatially predicted pixel values, of the inversely quantized and inversely transformed decoded bitstream, according to the spatially predicted pixel values having been spatially predicted using neighboring blocks in a row immediately above the current block, among neighboring blocks that are spatially adjacent to the current block, based on a replacing of pixel values of neighboring blocks in respective rows immediately above a respective current block in every predetermined row unit within the respective current block with respective predetermined reference values.

To achieve the above and/or other aspects and advantages, embodiments of the present invention include at least one medium including computer readable code to control at least one processing element to implement one or more embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
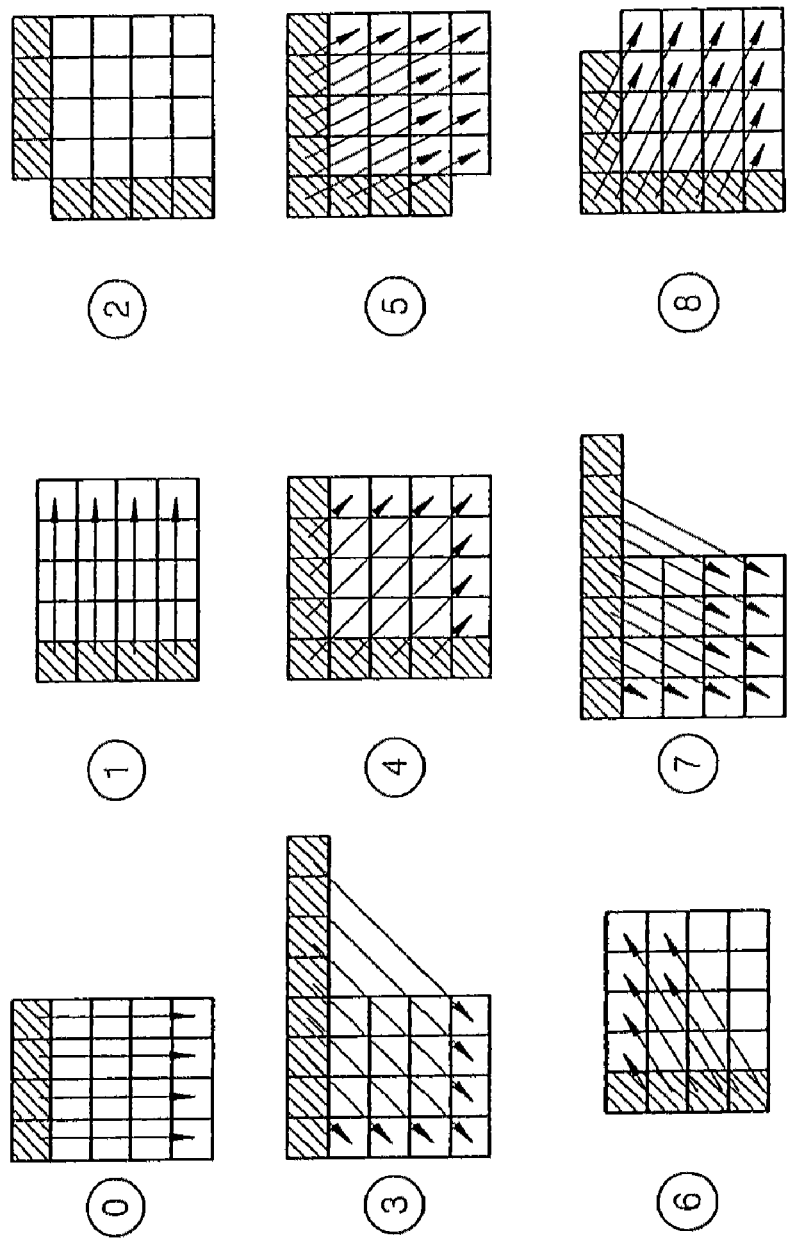
FIG. 1 illustrates eight prediction directions for conventional spatial prediction.
Figure 2:
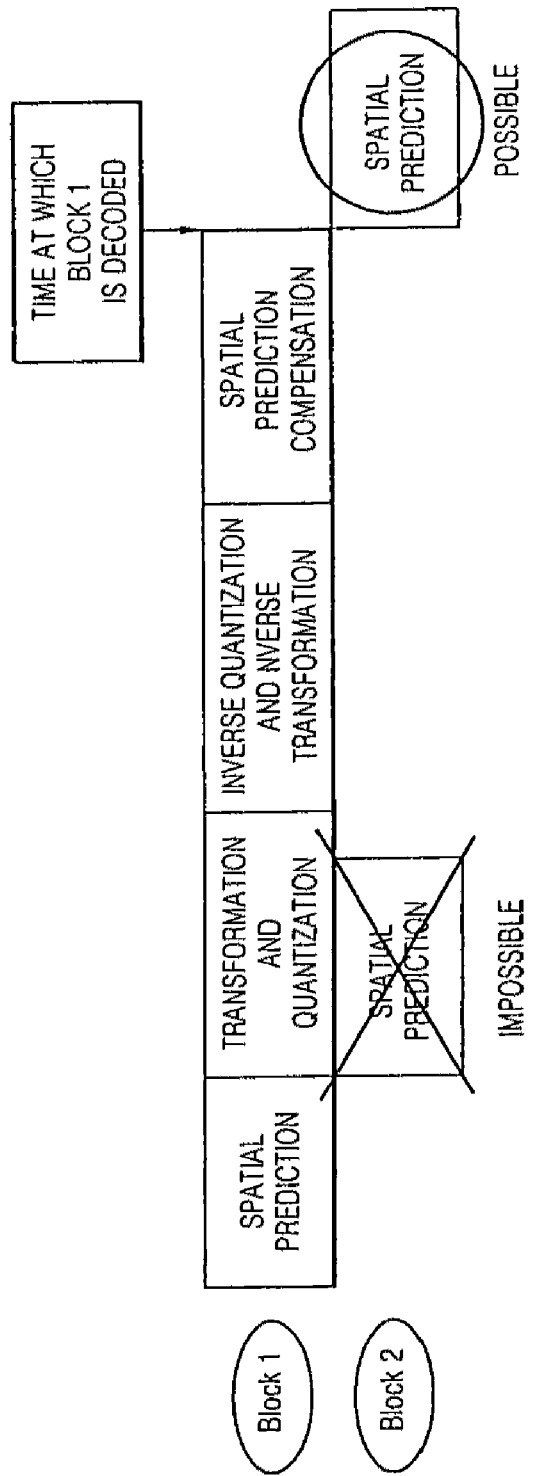
FIG. 2 illustrates a pipeline processing with spatial prediction.

Reference will now be made in detail to embodiments of the present invention, examples of which are illustrated in the accompanying drawings, wherein like reference numerals refer to the like elements throughout. Embodiments are described below to explain the present invention by referring to the figures.

Figure 3:
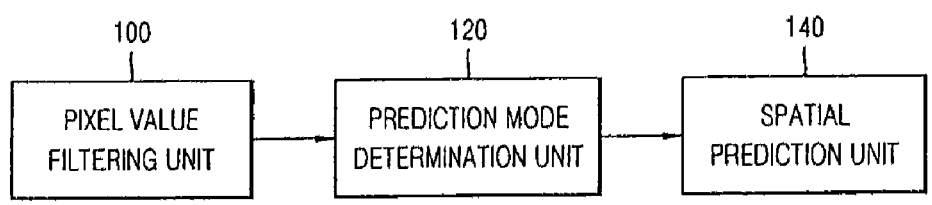
FIG. 3 illustrates a system for spatial prediction of image data, according to an embodiment of the present invention.

FIG. 3 illustrates a system for spatial prediction of image data, according to an embodiment of the present invention. Referring to FIG. 3, the system may include a pixel value filtering unit 100, a prediction mode determination unit 120, and a spatial prediction unit 140, for example.

The pixel value filtering unit 100 may filter pixel values of neighboring blocks in a row immediately above a current block, which can be used for spatial prediction of the current block, among neighboring blocks that are spatially adjacent to the current block, and output the filtered pixel values to the prediction mode determination unit 120, for example. The filtering is desired to prevent display quality degradation caused by the spatial prediction using only the pixel values of the neighboring blocks in the row immediately above the current block.

In particular, the pixel value filtering unit 100 detects the average of pixel values adjacent to an arbitrary pixel value among the pixel values of the neighboring blocks in the row immediately above the current block as a filtered value of the arbitrary pixel value.

Figure 4:
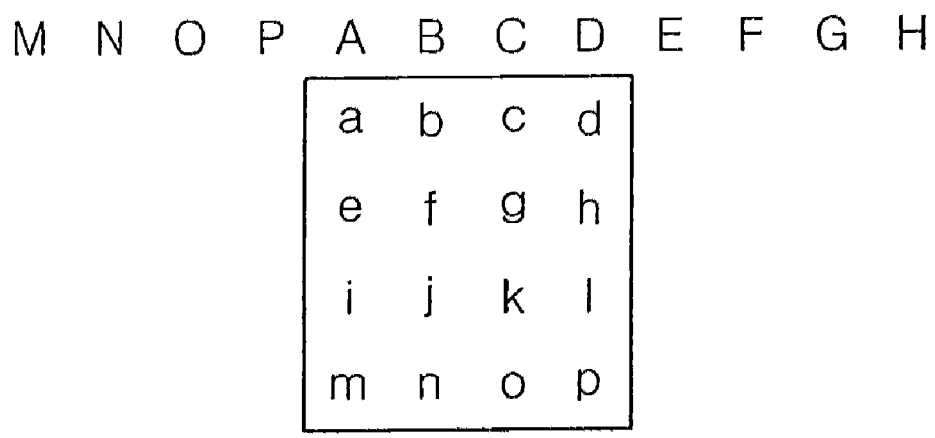
FIG. 4 illustrates pixel values of a 4×4 block and pixel values adjacent to the 4×4 block.

FIG. 4 illustrates pixel values of a 4×4 block and pixel values adjacent to the 4×4 block. Here, such filtering will be described with reference to FIG. 4. As noted, FIG. 4 illustrates pixel values M-P above and to the left of the 4×4 block, pixel values A-D directly above the 4×4 block, and pixel values E-H above and the right of the 4×4 block. As an example of the operation of the pixel value filtering unit 100, the pixel value filtering unit 100 may detect the average of pixel values located on the left and right sides of a pixel value A among pixel values of neighboring blocks in a row immediately above the 4×4 block as a filtered value of the pixel value A. In other words, instead of using only the pixel value of A, one of (P+B)/2, (P+2A+B)/4, (2O+3P+6A+3B+2C)/16, etc., may be used for spatial prediction. Similarly, instead of only using the pixel value B, one of (A+C)/2, (A+2B+C)/4, (2P+3A+6B+3C+2D)/16, etc., may be used for spatial prediction. The other pixel values of the adjacent blocks may be filtered in this manner. Briefly, the filtering described above is only an example and filtering may be performed using more or less pixel values of adjacent blocks.

The prediction mode determination unit 120 may determine a spatial prediction mode for the current block using the pixel values of the neighboring blocks in the row immediately above the 4×4 block and the filtered pixel values obtained by the pixel value filtering unit 100 and output the determined spatial prediction mode to the spatial prediction unit 140.

The prediction mode determination unit 120 may, thus, determine, as a spatial prediction mode, a spatial prediction direction having the minimum sum of differential values between the pixel values of the neighboring blocks in the row immediately above the 4×4 block and the pixel values of the current block and the minimum sum of differential values between the filtered pixel values of the neighboring blocks in the row immediately above the 4×4 block and pixel values of the current block, for example. Here, the spatial prediction direction may be one of a vertical direction, a diagonal down-right direction, and a diagonal down-left direction.

Figure 5A:
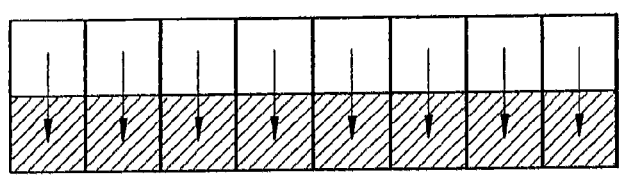
FIGS. 5A-5C illustrates prediction directions for an 8×1 one-dimensional block.
Figure 5B:
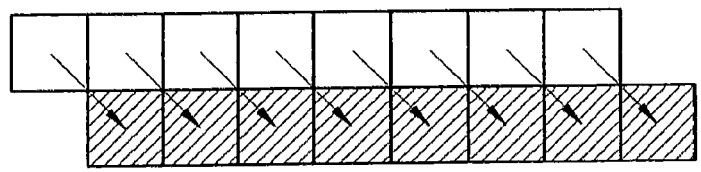
Figure 5C:
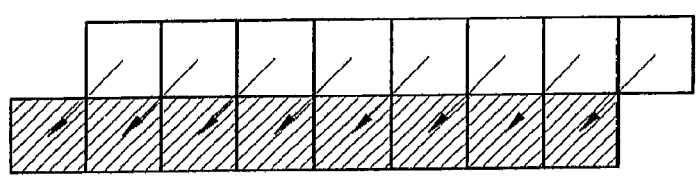

FIGS. 5A-5C illustrate prediction directions for an 8×1 one-dimensional block. In an embodiment, the one-dimensional block means a block having one row. FIG. 5A illustrates the case where the prediction direction for such an 8×1 block is a vertical direction, FIG. 5B illustrates the case where the prediction direction for the 8×1 block is a diagonal down-right direction, and FIG. 5C illustrates the case where the prediction direction for the 8×1 block is a diagonal down-left direction. Here, the spatial prediction directions illustrated in FIGS. 5A-C are only examples, as a variety of spatial prediction directions may be used.

Figure 6A:
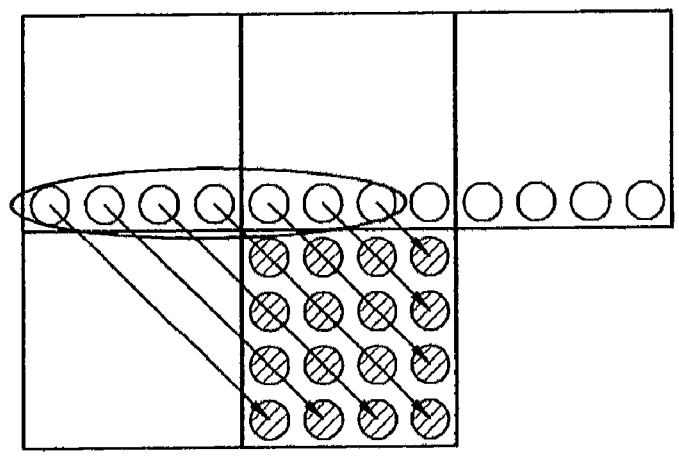
FIGS. 6A-6C illustrates prediction directions for a 4×4 two-dimensional block.
Figure 6B:
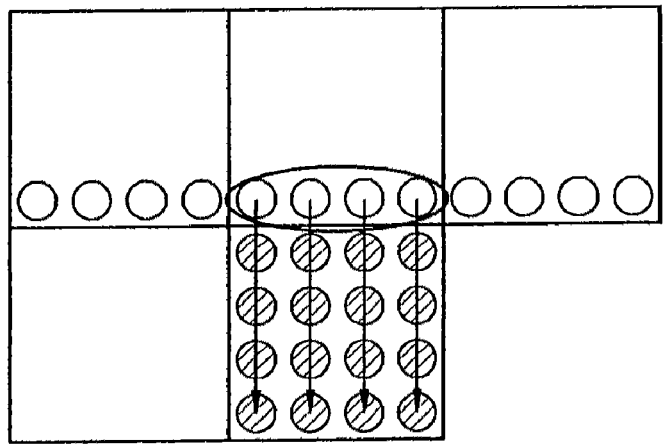
Figure 6C:
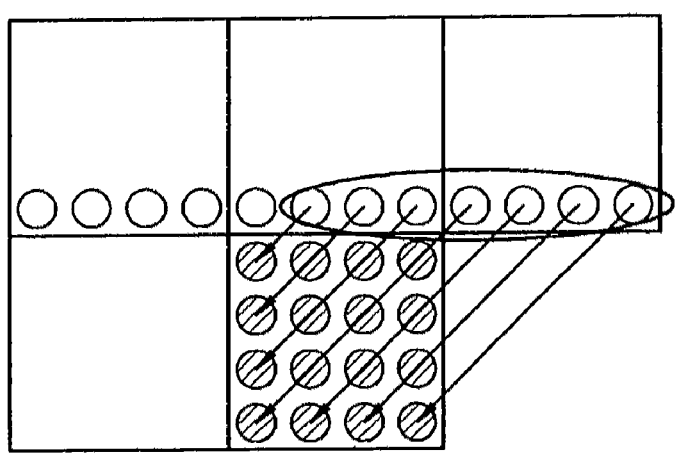

FIGS. 6A-C illustrate prediction directions for a 4×4 two-dimensional block. The two-dimensional block means a block having at least two rows. FIG. 6A illustrates a case where the prediction direction for the 4×4 block is a diagonal down-right direction, FIG. 6B illustrates a case where the prediction direction for the 4×4 block is a vertical direction, and FIG. 6C illustrates a case where the prediction direction for the 4×4 block is a diagonal down-left direction. Similar to above, the spatial prediction directions illustrated in FIGS. 6A-C are only examples, as a variety of spatial prediction directions may be used.

The spatial prediction mode may include a first prediction mode for prediction using the filtered pixel values of the neighboring blocks in the row immediately above the 4×4 block in the vertical direction, a second prediction mode for prediction using the original pixel values of the neighboring blocks that are not filtered in the vertical direction, a third prediction mode for prediction using the filtered pixel values of the neighboring blocks in the row immediately above the 4×4 block in the diagonal down-right direction, and a fourth prediction mode for prediction using the filtered pixel values of the neighboring blocks in the row immediately above the 4×4 block in the diagonal down-left direction, for example. In an embodiment, the spatial prediction mode may further include a fifth prediction mode for prediction using the original pixel values of the neighboring blocks that are not filtered in the diagonal down-right direction and a sixth prediction mode for prediction using the original pixel values of the neighboring blocks that are not filtered in the diagonal down-left direction. In a further embodiment, the number of spatial prediction modes may increase when the spatial prediction directions are further segmented in addition to the vertical direction, the diagonal down-right direction, and the diagonal down-left direction, for example.

The determination of the spatial prediction mode will now be described with reference to FIGS. 4 and 5. At this time, the prediction mode will further be assumed to be one of the first through fourth prediction modes. The prediction mode determination unit 120 may obtain differential values between pixel values of the current block along the vertical direction and pixel values of an adjacent block along the vertical direction in a row immediately above the current block. With reference to FIG. 4, the obtained differential values may be $a_1=a-A$, $b_1=b-B$, $c_1=c-C$, $d_1=d-D$, $e_1=e-A$, $f_1=f-B$, $g_1=g-C$, $h_1=h-D$, $i_1=i-A$, $j_1=j-B$, $k_1=k-C$, $l_1=l-D$, $m_1=m-A$, $n_1=n-B$, $o_1=o-C$, and $p_1=p-D$. Here, in the described example, it may be assumed that sums of absolute values of differential values for R, G, and B along the vertical direction are $S_{11}$, $S_{12}$, and $S_{13}$.

Thus, if the filtered pixel values are A', B+, C', D', E', F', G', H', M', N', O', and P', the prediction mode determination unit 120 may obtain differential values between pixel values of the current block along the vertical direction and the filtered pixel values, with the obtained differential values being $a_2=a-A'$, $b_2=b-B'$, $c_2=c-C'$, $d_2=d-D'$, $e_2=e-A'$, $f_2=f-B'$, $g_2=g-C'$, $h_2=h-D'$, $i_2=i-A'$, $j_2=j-B'$, $k_2=k-C'$, $l_2=l-D'$, $m_2=m-A'$, $n_2=n-B'$, $o_2=o-C'$, and $P_2=p-D'$. Here, it may be assumed in this example that sums of absolute values of differential values for R, G, and B along the vertical direction are $S_{21}$, $S_{22}$, and $S_{23}$.

The prediction mode determination unit 120 may further obtain differential values between pixel values of the current block along the diagonal down-right direction and the filtered pixel values of pixel values of adjacent blocks along the diagonal down-right direction in the row immediately above the current block, with the obtained differential values being $a_3=a-P'$, $b_3=b-A'$, $c_3=c-B'$, $d_3=d-C'$, $e_3=e-C'$, $f_3=f-P'$, $g_3=g-A'$, $h_3=h-B'$, $i_3=i-N'$, $j_3=j-O'$, $k_3=k-P'$, $l_3=l-A'$, $m_3=m-M'$, $n_3=n-N'$, $o_3=o-O'$, and $p_3=p-P'$. It may be assumed in this example that sums of absolute values of differential values for R, G, and B along the diagonal down-right direction are $S_4$, $S_5$, and $S_6$.

The prediction mode determination unit 120 may still further obtain differential values between pixel values of the current block along the diagonal down-left direction and the filtered pixel values of pixel values of adjacent blocks along the diagonal down-left direction in the row immediately above the current block, with the obtained differential values being $a_4$=a-B', $b_4$=b-C', $c_4$=c-D', $d_4$=d-E', $e_4$=e-C', $f_4$=f-D', $g_4$=g-E', $h_4$=h-FB', $i_4$=i-D', $j_4$=j-E', $k_4$=k-F', $l_4$=l-G', $m_4$=m-E', $n_4$=n-F', $o_4$=o-G', and $p_4$=p-H'. Similar to above, it may herein be assumed that sums of absolute values of differential values for R, G, and B along the diagonal down-right direction are $S_7$, $S_8$, and $S_9$.

Accordingly, the prediction mode determination unit 120 may determine spatial prediction directions having the minimum values among $S_{11}$, $S_{12}$, $S_{13}$, $S_{21}$, $S_{22}$, $S_{23}$, $S_4$, $S_5$, $S_6$, $S_7$, $S_8$, and $S_9$ for R, G, and B as spatial prediction modes for R, G, and B, for example.

At this time, different spatial prediction modes may be determined for R, G, and B, or a common spatial prediction mode may be determined for R, G, and B.

In other words, a spatial prediction direction having the minimum value among $S_{11}$, $S_{21}$, $S_4$, and $S_7$ may be determined as a spatial prediction mode for R, a spatial prediction direction having the minimum value among $S_{12}$, $S_{22}$, $S_5$, and $S_8$ may be determined as a spatial prediction mode for G, and a spatial prediction direction having the minimum value among $S_{13}$, $S_{23}$, $S_6$, and $S_9$ may be determined as a spatial prediction mode for B, for example.

In addition, in an embodiment, a common spatial prediction mode having the minimum value among $S_{v1}$=$S_{11}$+$S_{12}$+$S_{13}$, $S_{v2}$=$S_{21}$+$S_{22}$+$S_{23}$, $S_R$=$S_4$+$S_5$+$S_6$, and $S_L$=$S_7$+$S_8$+$S_9$ may be determined for R, G, and B.

When a sum of the sums for R, G, and B is obtained, different weights may be applied to the sums. For example, different weights may be applied to $S_{11}$, $S_{12}$, and $S_{13}$. In other words, $S_{v1}$=$0.3 \times S_{11}$+$0.6 \times S_{12}$+$0.1 \times S_{13}$, noting that alternate weighting embodiments are equally available. As an example, such weighting may be important for processing of the color G in image processing.

The spatial prediction unit 140 may spatially predict the pixel values of the current block using neighboring blocks in a row immediately above the current block. Unlike in the conventional techniques, the spatial prediction unit 140 according to an embodiment of the present invention uses only pixel values of neighboring blocks in a row immediately above the current block for spatial prediction. The spatial prediction direction may be one of the vertical direction, the diagonal down-right direction, and the diagonal down-left direction, as mentioned above.

The spatial prediction unit 140 may spatially predict pixel values of a one-dimensional block and/or a two-dimensional block. As noted above, FIGS. 5A-C illustrate prediction directions for a one-dimensional block and FIGS. 6A-C illustrate prediction directions for a two-dimensional block.

Figure 7A:
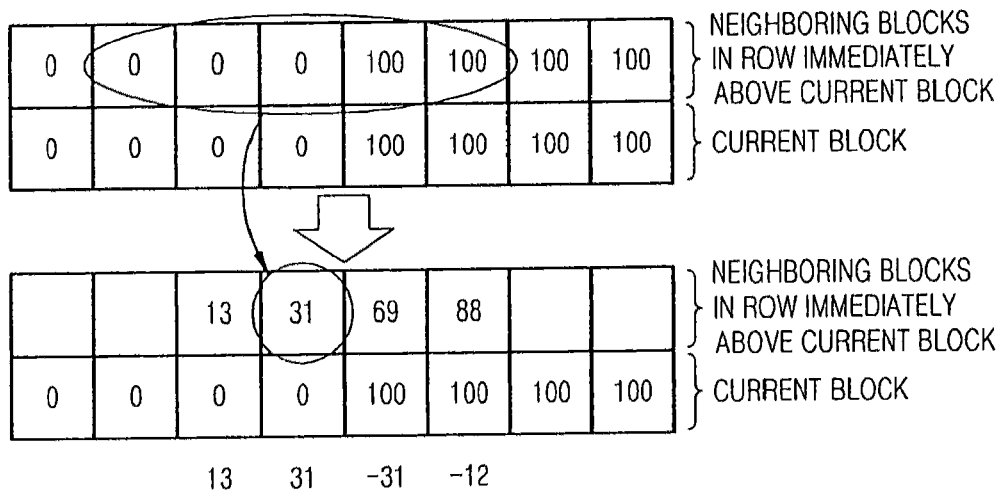
FIGS. 7A and 7B explain vertical spatial prediction with respect to a one-dimensional block of an image having an edge.
Figure 7B:
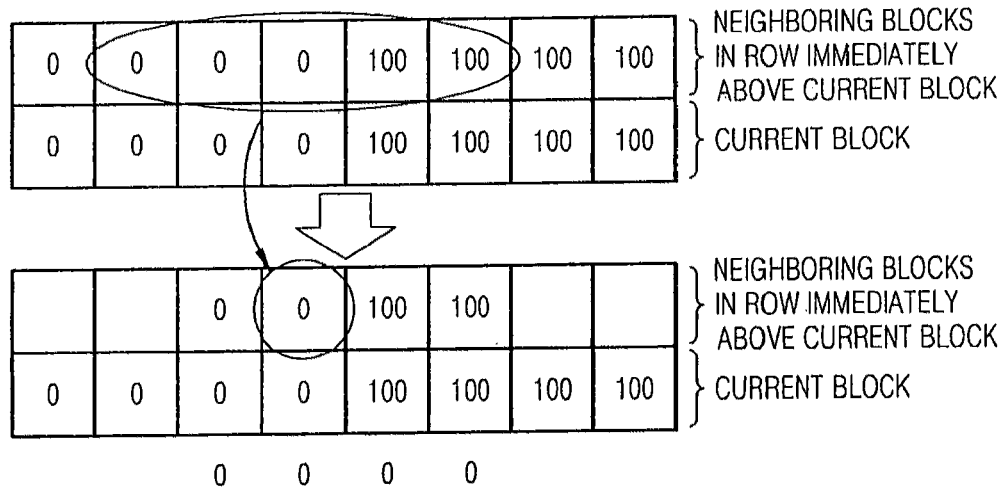

FIGS. 7A-B explain vertical spatial prediction with respect to a one-dimensional block of an image having an edge.

As illustrated in FIG. 7A, pixel values 0, 0, 100, and 100 of neighboring blocks of the current block in a row immediately above the current block may be filtered by the pixel value filtering unit 100 and thus replaced with filtered pixel values 13, 31, 69, and 88. Spatially predicted values 13, 31, −31, and −12 can be obtained from differential values between the filtered pixel values and pixel values of the current block.

As illustrated in FIG. 7B, spatially predicted values 0, 0, 0, and 0 may be obtained from pixel values 0, 0, 100, and 100 of neighboring blocks of the current block in a row immediately above the current block and pixel values of the current block.

Spatial prediction using filtered pixel values of pixel values of the neighboring blocks in a row immediately above the current block in an image having an edge has lower coding efficiency than spatial prediction using the original pixel values of the neighboring blocks. The prediction mode determination unit 120 may, thus, determine a prediction mode having higher coding efficiency for the spatial prediction mode. In other words, the prediction mode determination unit 120 may determine, as a spatial prediction mode, a prediction mode in which prediction is performed using the original pixel values of the neighboring blocks along the vertical direction, i.e., the aforementioned second prediction mode. The spatial prediction unit 140 may then obtain spatially predicted values from differential values between the original pixel values of the neighboring blocks along the vertical direction and pixel values of the current block along the vertical direction according to the determined second prediction mode.

The spatial prediction unit 140 may further replace pixel values of neighboring blocks in a row immediately above the current block every predetermined row unit of an image with a predetermined reference value for spatial prediction, for example.

Figure 8:
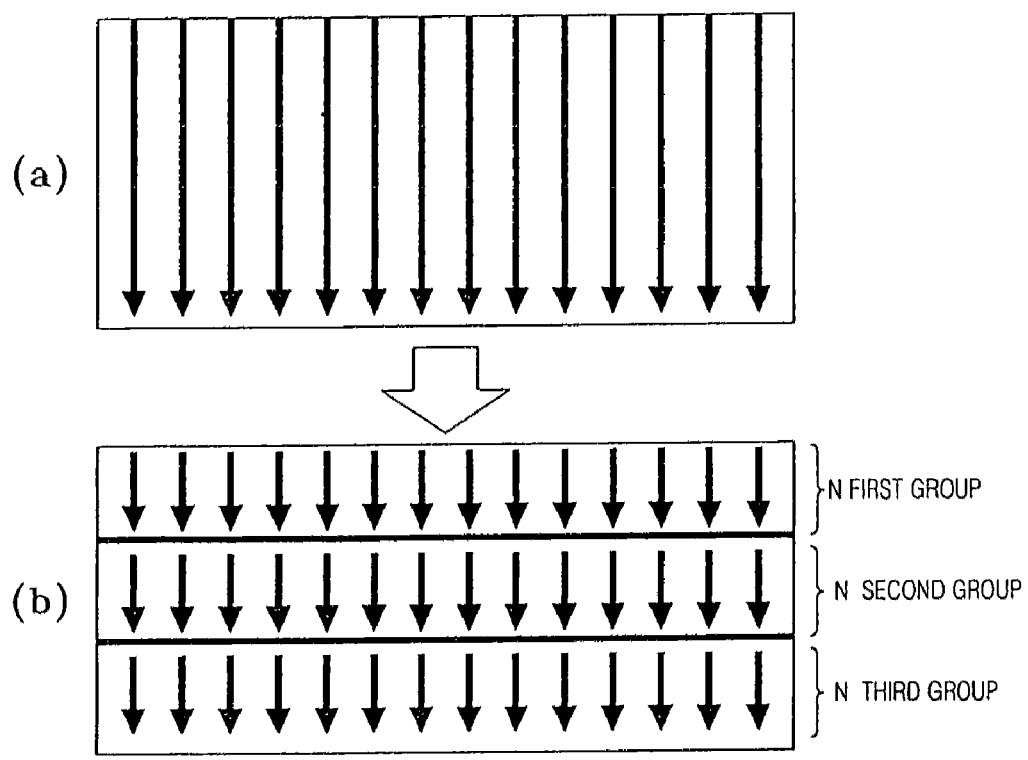
FIG. 8 explains spatial prediction after replacing pixel values of neighboring blocks of a current block in a row immediately above every predetermined row unit with a predetermined reference value.

In the illustrated portion (a) of FIG. 8, spatial prediction has been illustrated as being performed based on pixel values of neighboring blocks of the current block in a row immediately above the current block over the entire image in a conventional manner.

In the illustrated portion (b) of FIG. 8, each N rows of an image may be grouped and, if spatial prediction with respect to a first group including N rows is completed, spatial prediction with respect to the first row of a second group may be performed using a predetermined reference value as pixel values of neighboring blocks in a row immediately above the current block, instead of using pixel values in the last row of the first group. Similarly, once spatial prediction with respect to the second group is completed, pixel values in the first row of the third group may be spatially predicted using the predetermined reference value, instead of using pixel values in the last row of the second group.

In an embodiment, the predetermined reference value may be set based on an intermediate gray scale among gray scales of an image. For example, if the gray scales of an image range from 0 to 255, an intermediate gray scale of 128 can be used as the predetermined reference value. Thus, differential values between pixel values in the first row of each group and the predetermined reference value, e.g., 128, may be obtained as spatially predicted pixel values.

As illustrated in portion (b) of FIG. 8, by performing spatial prediction after replacing pixel values of neighboring blocks in a row immediately above the current block every, for example, predetermined row unit (here, N rows) with a predetermined reference value, it is possible to prevent an error generated during spatial prediction with respect to an image having an edge from be diffused.

Figure 9:
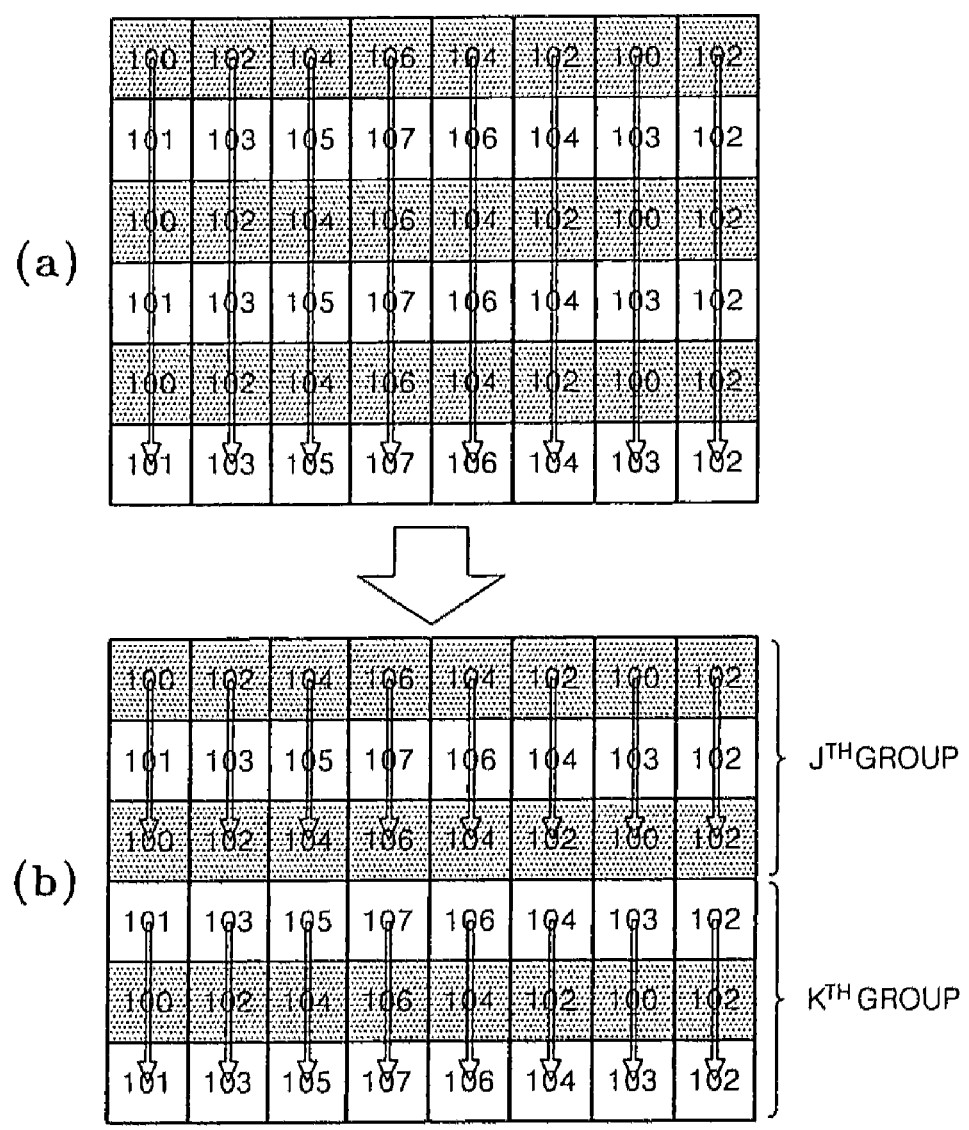
FIG. 9 explains spatial prediction after replacing pixel values of neighboring blocks in a row immediately above every third row with a predetermined reference value.

FIG. 9 explains spatial prediction after replacing pixel values of neighboring blocks in a row immediately above every third row with a predetermined reference value. In the illustrated portion (a) of FIG. 9, spatial prediction is performed in a conventional manner. In the illustrated portion (b) of FIG. 9, each three rows of an image are grouped and, if spatial prediction with respect to a $j^{th}$ group is completed, spatial prediction with respect to the first row of a $k^{th}$ group are performed by using a predetermined reference value, i.e., 128, as pixel values of neighboring blocks in a row immediately above the first row of the $k^{th}$ group, instead of using pixel values in the last row of the $j^{th}$ group and obtaining differential values between pixel values in the first row of the k$^{th}$ group and the predetermined reference value.

Figure 10:
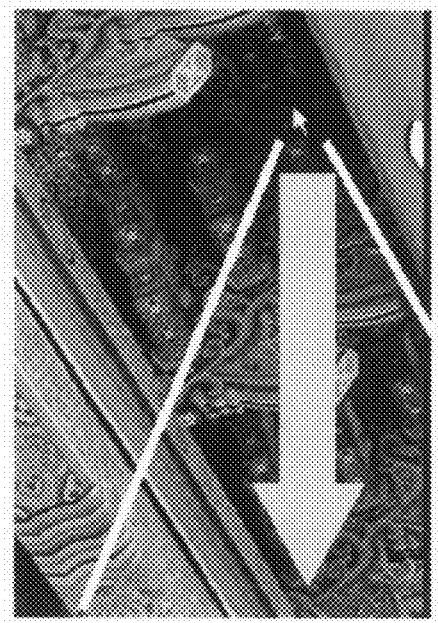
FIG. 10 explains prevention of an error generated during encoding due to an edge (e.g., a cursor) of an image.
Figure 10:
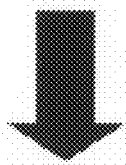
Figure 10:
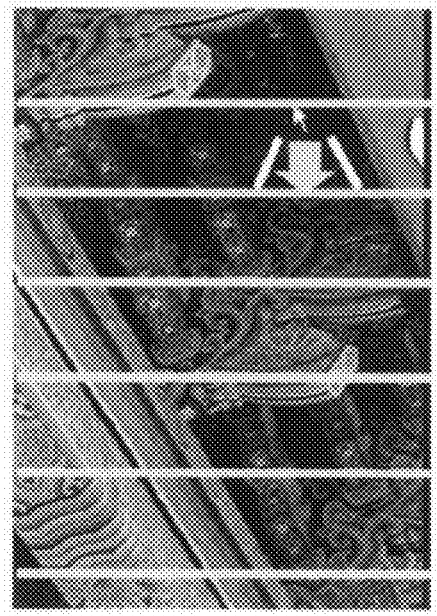

FIG. 10 explains a prevention of an error generated during encoding due to an edge (e.g., the illustrated cursor) of an image. In the illustrated portion (a) of FIG. 10, an error generated in a position including the cursor is diffused during encoding of a portion of the image below the cursor. In the illustrated portion (b) of FIG. 10, by replacing pixel values of neighboring blocks in a row immediately above every predetermined row unit with a predetermined reference value, error diffusion can be defined within a second group having a cursor. In this way, by preventing error diffusion in spatial prediction with respect to an edge of an image, display quality degradation can be avoided.

Hereinafter, a system for encoding image data, according to an embodiment of the present invention, will be described with reference to FIG. 11.

Figure 11:
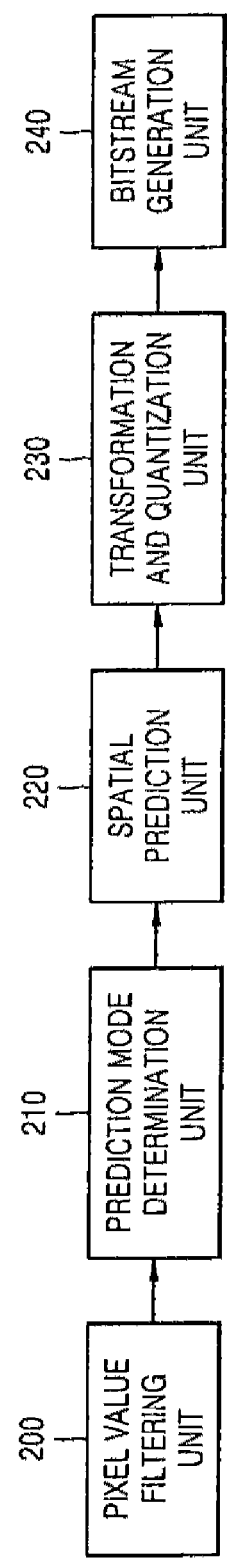
FIG. 11 illustrates a system for encoding image data, according to an embodiment of the present invention.

FIG. 11 is a block diagram of a system for encoding image data, according to an embodiment of the present invention. Referring to FIG. 11, the system may include a pixel value filtering unit 200, a prediction mode determination unit 210, a spatial prediction unit 220, a transformation and quantization unit 230, and a bitstream generation unit 240, for example.

The pixel value filtering unit 200 may filter pixel values of neighboring blocks in a row immediately above a current block, which can be used for spatial prediction of the current block, for example. The pixel value filtering unit 200 may detect the average of pixel values adjacent to an arbitrary pixel value among the pixel values of the neighboring blocks in the row immediately above the current block as a filtered value of the arbitrary pixel value. The pixel value filtering unit 200 may operate similarly as the pixel value filtering unit 100 and thus further detailed description will not be set forth herein.

The prediction mode determination unit 210 may determine a spatial prediction mode for the current block using the pixel values of the neighboring blocks in the row immediately above the current block and the filtered pixel values obtained by the pixel value filtering unit 200, for example.

In an embodiment, the prediction mode determination unit 210 may determine, as a spatial prediction mode, a spatial prediction direction having the minimum sum of differential values between the pixel values of the neighboring blocks in the row immediately above the current block and the pixel values of the current block and the minimum sum of differential values between the filtered pixel values of the neighboring blocks in the row immediately above the current block and the pixel values of the current block.

Here, the spatial prediction direction may be, for example, one of a vertical direction, a diagonal down-right direction, and a diagonal down-left direction. The spatial prediction mode may further include a first prediction mode for prediction using the filtered pixel values of the neighboring blocks in the row immediately above the current block in the vertical direction, a second prediction mode for prediction using the original pixel values of the neighboring blocks that are not filtered in the vertical direction, a third prediction mode for prediction using the filtered pixel values of the neighboring blocks in the row immediately above the current block in the diagonal down-right direction, and a fourth prediction mode for prediction using the filtered pixel values of the neighboring blocks in the row immediately above the current block in the diagonal down-left direction, for example.

The spatial prediction mode may still further include a fifth prediction mode for prediction using the original pixel values of the neighboring blocks that are not filtered in the diagonal down-right direction and a sixth prediction mode for prediction using the original pixel values of the neighboring blocks that are not filtered in the diagonal down-left direction. In addition, the number of spatial prediction modes may increase when the spatial prediction directions are further segmented in addition to the vertical direction, the diagonal down-right direction, and the diagonal down-left direction. Similar to the above, the prediction mode determination unit 210 operates similar to the prediction mode determination unit 120 and thus further detailed description will not be set forth herein.

The spatial prediction unit 220 may spatially predict the pixel values of the current block using neighboring blocks in a row immediately above the current block. In an embodiment, the spatial prediction unit 220 uses only pixel values of neighboring blocks in a row immediately above the current block for spatial prediction. The spatial prediction direction may be one of the vertical direction, the diagonal down-right direction, and the diagonal down-left direction, as mentioned above, for example. The spatial prediction unit 220 may spatially predict pixel values of a one-dimensional block and/or a two-dimensional block, such as respectfully illustrated in FIGS. 5A-C and FIGS. 6A-C.

The spatial prediction unit 220 may perform spatial prediction after replacing pixel values of neighboring blocks in a row immediately above every predetermined row unit with a predetermined reference value. As noted above, the predetermined reference value may be set based on an intermediate gray scale among gray scales of an image. For example, if the gray scales of an image range from 0 to 255, an intermediate gray scale of 128 may be used as the predetermined reference value. Thus, differential values between pixel values in the first row of each group and the predetermined reference value, e.g., 128, may be obtained as spatially predicted pixel values. The spatial prediction unit 220 may operate similar to the spatial prediction 140 and thus further detailed description will not be set forth herein.

The transformation and quantization unit 230 may transform and quantize spatially predicted pixel values. The transformation may be orthogonal transformation encoding, for example. Discrete cosine transform (DCT) is most widely used as orthogonal transformation encoding. DCT transforms an image signal in a time domain into a frequency domain, like in fast Fourier transform (FFT), and uses a discrete cosine function as a transformation coefficient. DCT performs transformation with respect to several frequency domains having a large signal power and a small signal power in the image signal in the time domain. Since the power of the image signal concentrates in a low frequency region, quantization with appropriate bit assignment can lead to data compression with a small number of bits.

The bitstream generation unit 240 may further generate a bitstream corresponding to the transformed and quantized pixel values according to a prediction mode.

Hereinafter, a system for spatial prediction compensation of image data, according to an embodiment of the present invention will be described with reference to FIG. 12.

Figure 12:
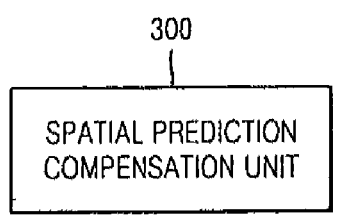
FIG. 12 illustrates a system for spatial prediction compensation of image data, according to an embodiment of the present invention.

FIG. 12 is a block diagram of a system for spatial prediction compensation of image data according to the present invention. Referring to FIG. 12, the system corresponds to a spatial prediction compensation unit 300.

The spatial prediction compensation unit 300 may compensate for spatially predicted pixel values only using pixel values of neighboring blocks in a row immediately above the current block. The spatially predicted pixel values can be obtained by the spatial prediction units 140 and 210, for example, only using pixel values of neighboring blocks in a row immediately above the current block. During decoding of the spatially predicted pixel values, the spatial prediction compensation unit 300 may compensate for the spatially predicted pixel values only using the pixel values of neighboring blocks in a row immediately above the current block according to an inverse process to that performed in the spatial prediction units 140 and 210, for example.

In an embodiment, the spatial prediction compensation unit 300 compensates for spatially predicted pixel values in every predetermined row unit of an image. In other words, here, the spatial prediction compensation unit 300 compensates for pixel values that are spatially predicted after replacing pixel values of neighboring blocks in a row immediately above every predetermined row unit with a predetermined reference value (e.g., an intermediate gray scale among gray scales of the image). Briefly, the referenced replacement of pixel values of neighboring blocks references the replacement of values obtained from such neighboring block pixel values, such as for such spatial prediction or spatial prediction compensation with a modification of such values obtained from such neighboring block pixel values, rather than the actual changing of the values of such neighboring block pixel values within the corresponding image.

Hereinafter, a system for decoding image data, according to an embodiment of the present invention, will be described in greater detail with reference to FIG. 13.

Figure 13:
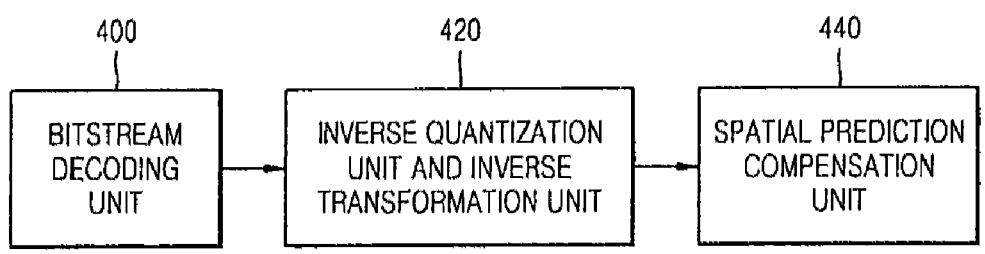
FIG. 13 illustrates a system for decoding image data, according to an embodiment of the present invention.

FIG. 13 illustrates a system for decoding image data, with the system including a bitstream decoding unit 400, an inverse quantization and inverse transformation unit 420, and a spatial prediction compensation unit 440, for example.

The bitstream decoding unit 400 may decode a bitstream of image data.

The inverse quantization and inverse transformation unit 420 may further inversely quantize and inversely transform the decoded bitstream. Here, the inverse quantization and inverse transformation unit 420 may inversely quantize and inversely transform the decoded bitstream according to an inverse process to the aforementioned transformation and quantization process, for example.

In an embodiment, the spatial prediction compensation unit 440 may compensate for pixel values that are spatially predicted only using pixel values of neighboring blocks in a row immediately above the current block. Here, the spatially predicted pixel values may further be achieved by the spatial prediction units 140 and 210, for example, only using pixel values of neighboring blocks in a row immediately above the current block. Accordingly, during decoding of the spatially predicted pixel values, the spatial prediction compensation unit 440 may compensate for the spatially predicted pixel values only using the pixel values of neighboring blocks in a row immediately above the current block according to an inverse process to that performed in the spatial prediction units 140 and 210, for example.

In an embodiment, the spatial prediction compensation unit 440 compensates for spatially predicted pixel values in every predetermined row unit of an image. In other words, the spatial prediction compensation unit 440 may compensate for pixel values that are spatially predicted after replacing pixel values of neighboring blocks in a row immediately above every predetermined row unit with a predetermined reference value (e.g., an intermediate gray scale among gray scales of the image).

Figure 14:
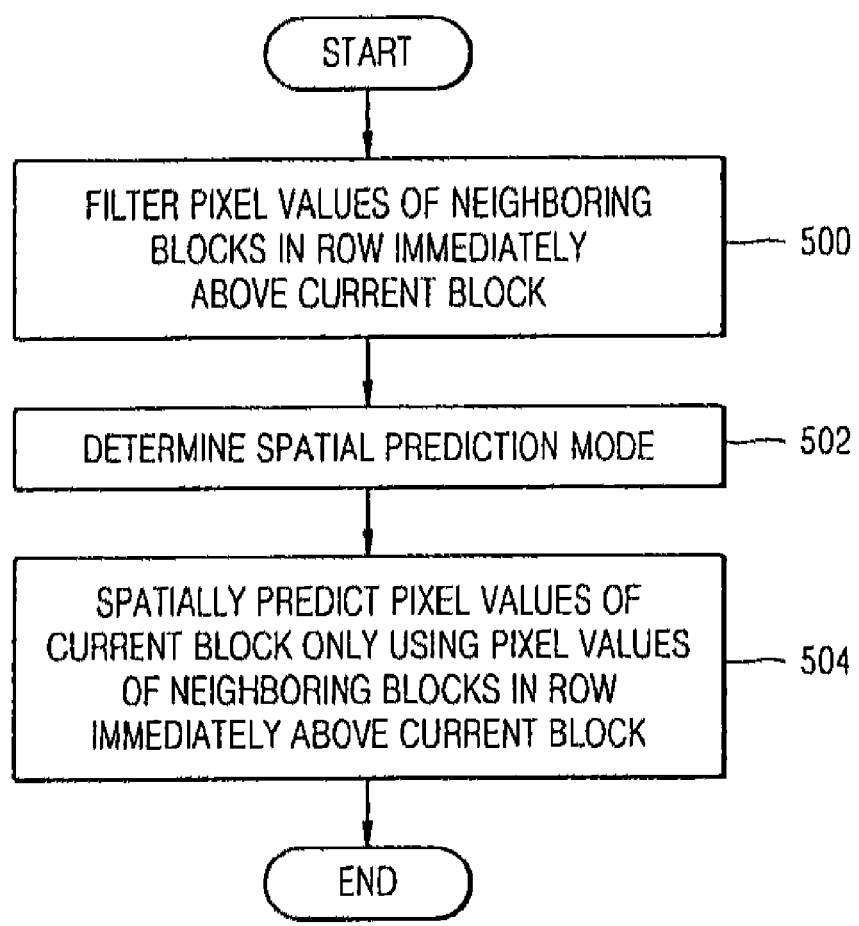
FIG. 14 illustrates a method for spatial prediction of image data, according to an embodiment of the present invention.

FIG. 14 illustrates a method for spatial prediction of image data, according to an embodiment of the present invention.

In operation 500, pixel values of neighboring blocks of the current block in a row immediately above the current block are filtered. The filtering is desired to prevent display quality degradation caused by the spatial prediction using only the pixel values of the neighboring blocks in the row immediately above the current block. In particular, in an embodiment, the average of pixel values adjacent to an arbitrary pixel value among the pixel values of the neighboring blocks in the row immediately above the current block is detected as a filtered value of the arbitrary pixel value. Such filtering of pixel values of neighboring blocks has already been described and thus will not be described further.

In operation 502, a spatial prediction mode for the current block may be determined using the pixel values of the neighboring blocks and the filtered pixel values. In addition, a spatial prediction direction having the minimum sum of differential values between the pixel values of the neighboring blocks in the row immediately above the current block and the pixel values of the current block and the minimum sum of differential values between the filtered pixel values of the neighboring blocks in the row immediately above the current block and the pixel values of the current block may be determined as a spatial prediction mode for the current block. Here, the spatial prediction direction may be one of a vertical direction, a diagonal down-right direction, and a diagonal down-left direction, for example.

In an embodiment, the spatial prediction mode may include a first prediction mode for prediction using the filtered pixel values of the neighboring blocks in the row immediately above the current block in the vertical direction, a second prediction mode for prediction using the original pixel values of the neighboring blocks that are not filtered in the vertical direction, a third prediction mode for prediction using the filtered pixel values of the neighboring blocks in the row immediately above the current block in the diagonal down-right direction, and a fourth prediction mode for prediction using the filtered pixel values of the neighboring blocks in the row immediately above the current block in the diagonal down-left direction, for example.

The spatial prediction mode may further include a fifth prediction mode for prediction using the original pixel values of the neighboring blocks that are not filtered in the diagonal down-right direction and a sixth prediction mode for prediction using the original pixel values of the neighboring blocks that are not filtered in the diagonal down-left direction. The number of spatial prediction modes may increase when the spatial prediction directions are further segmented in addition to the vertical direction, the diagonal down-right direction, and the diagonal down-left direction. Such a determination of a spatial prediction mode has already been described and thus will not be described further.

In operation 504, pixel values of the current block are spatially predicted in the determined spatial prediction mode using neighboring blocks of the current block in a row immediately above the current block. For example, the spatial prediction direction may be one of the vertical direction, the diagonal down-right direction, and the diagonal down-left direction, as mentioned above. Spatial prediction may be performed on a one-dimensional block or a two-dimensional block, such as respectively illustrated in FIGS. 5A-C and FIGS. 6A-C.

In an embodiment, spatial prediction may be performed after replacing pixel values of neighboring blocks in a row immediately above every predetermined row unit with a predetermined reference value. In one embodiment, the predetermined reference value is set based on an intermediate gray scale among gray scales of an image. In this example, if the gray scales of an image range from 0 to 255, an intermediate gray scale of 128 may be used as the predetermined reference value. Thus, differential values between pixel values in the first row of each group and the predetermined reference value, e.g., 128, are obtained as spatially predicted pixel values. Such spatial prediction only using neighboring blocks of the current block in a row immediately above the current block has already been described and thus will not be described in detail further.

Figure 15:
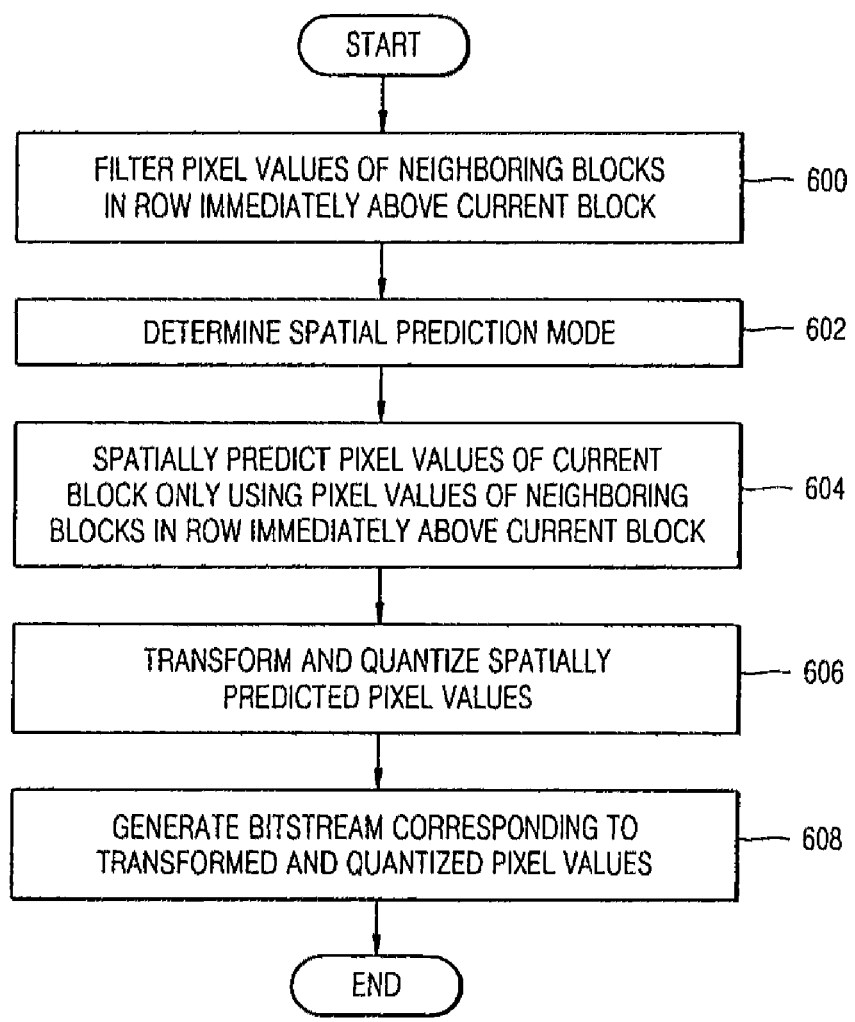
FIG. 15 illustrates a method for encoding image data, according to an embodiment of the present invention.

Hereinafter, a method for encoding image data, according to an embodiment of the present invention, will be described in greater detail with reference to FIG. 15.

In operation 600, pixel values of neighboring blocks of the current block in a row immediately above the current block are filtered. The filtering is desired to prevent display quality degradation caused by the spatial prediction using only the pixel values of the neighboring blocks in the row immediately above the current block. In particular, the average of pixel values adjacent to an arbitrary pixel value among the pixel values of the neighboring blocks in the row immediately above the current block can be detected as a filtered value of the arbitrary pixel value. Such filtering of the pixel values of neighboring blocks has already been described and thus will not be described further.

In operation 602, a spatial prediction mode for the current block may be determined using the pixel values of the neighboring blocks and the filtered pixel values. In an embodiment, a spatial prediction direction having the minimum sum of differential values between the pixel values of the neighboring blocks in the row immediately above the current block and the pixel values of the current block and the minimum sum of differential values between the filtered pixel values of the neighboring blocks in the row immediately above the current block and the pixel values of the current block may be determined as a spatial prediction mode for the current block. Here, in this example, the spatial prediction direction may be one of a vertical direction, a diagonal down-right direction, and a diagonal down-left direction, for example. The spatial prediction mode may include a first prediction mode for prediction using the filtered pixel values of the neighboring blocks in the row immediately above the current block in the vertical direction, a second prediction mode for prediction using the original pixel values of the neighboring blocks that are not filtered in the vertical direction, a third prediction mode for prediction using the filtered pixel values of the neighboring blocks in the row immediately above the current block in the diagonal down-right direction, and a fourth prediction mode for prediction using the filtered pixel values of the neighboring blocks in the row immediately above the current block in the diagonal down-left direction, for example.

The spatial prediction mode may further include a fifth prediction mode for prediction using the original pixel values of the neighboring blocks that are not filtered in the diagonal down-right direction and a sixth prediction mode for prediction using the original pixel values of the neighboring blocks that are not filtered in the diagonal down-left direction. The number of spatial prediction modes may increase when the spatial prediction directions are further segmented in addition to the vertical direction, the diagonal down-right direction, and the diagonal down-left direction. Such a determination of a spatial prediction mode has already described and thus will not be described further.

In operation 604, pixel values of the current block may be spatially predicted in the determined spatial prediction mode using neighboring blocks of the current block in a row immediately above the current block. In an embodiment, the spatial prediction direction may be one of the vertical direction, the diagonal down-right direction, and the diagonal down-left direction, as mentioned above. Spatial prediction may be performed on a one-dimensional block or a two-dimensional block, such as illustrated in respective FIGS. 5A-C and FIGS. 6A-C.

In particular, spatial prediction may be performed after replacing pixel values of neighboring blocks in a row immediately above every predetermined row unit with a predetermined reference value. In an embodiment, the predetermined reference value may be set based on an intermediate gray scale among gray scales of an image. In this example, if the gray scales of an image range from 0 to 255, an intermediate gray scale of 128 may be used as the predetermined reference value. Thus, differential values between pixel values in the first row of each group and the predetermined reference value, e.g., 128, can be obtained as spatially predicted pixel values. Spatial prediction only using neighboring blocks of a current block in a row immediately above the current block has already been described and thus will not be described further.

In operation 606, the spatially predicted pixel values may be transformed and quantized. In addition, the transformation may be orthogonal transformation encoding, with discrete cosine transform (DCT) being most widely used as orthogonal transformation encoding, for example.

In operation 608, a bitstream corresponding to the transformed and quantized pixel values may further be generated. The bitstream is generated using lossy encoding or lossless encoding.

Figure 16:
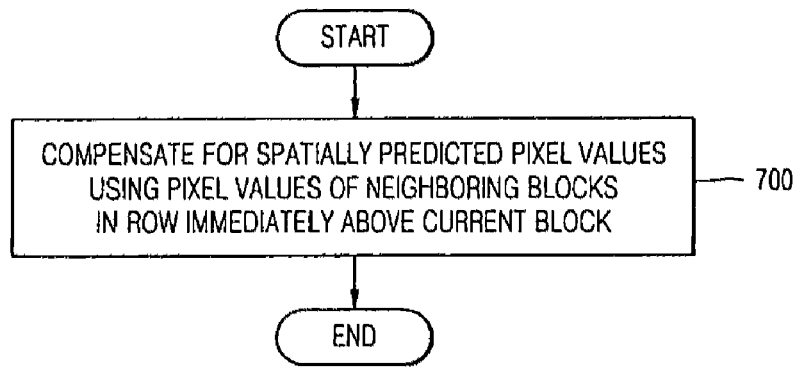
FIG. 16 illustrates a method for spatial prediction compensation of image data, according to an embodiment of the present invention.

Hereinafter, a method for spatial prediction compensation of image data, according to an embodiment of the present invention, will be described in detail with reference to FIG. 16.

In operation 700, spatially predicted pixel values may be compensated for using pixel values of neighboring blocks in a row immediately above the current block. The spatially predicted pixel values may have been achieved only using the pixel values of neighboring blocks in a row immediately above the current block. During decoding of the spatially predicted pixel values, the spatially predicted pixel values are compensated for only using the pixel values of neighboring blocks in a row immediately above the current block according to an inverse process to spatial prediction used for generation of the spatially predicted pixel values.

In particular, spatially predicted pixel values in every predetermined row unit of an image may be compensated for. In an embodiment, in operation 700, pixel values that are spatially predicted after replacing pixel values of neighboring blocks in a row immediately above every predetermined row unit with a predetermined reference value (e.g., an intermediate gray scale among gray scales of the image) are compensated for.

Figure 17:
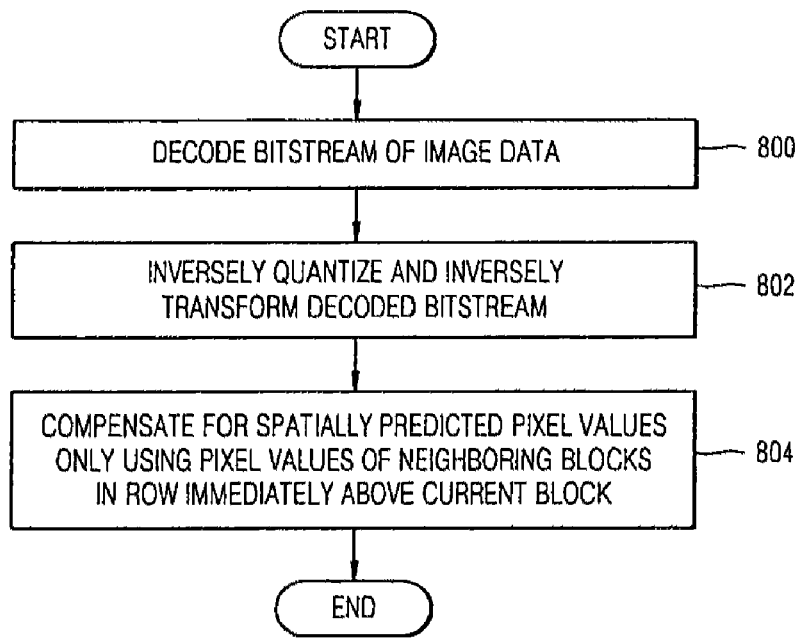
FIG. 17 illustrates a method for decoding image data, according to an embodiment of the present invention.

Hereinafter, a method for decoding image data, according to an embodiment of the present invention, will be described in greater detail with reference to FIG. 17.

In operation 800, a bitstream of image data may be decoded.

In operation 802, the decoded bitstream may further be inversely quantized and inversely transformed, with the decoded bitstream being inversely quantized and inversely transformed according to an inverse process to a transformation and quantization process used for generation of the bitstream.

In operation 804, spatially predicted pixel values may be compensated for using pixel values of neighboring blocks in a row immediately above the current block. The spatially predicted pixel values may have been achieved only using the pixel values of neighboring blocks in a row immediately above the current block. During decoding of the spatially predicted pixel values, the spatially predicted pixel values are compensated for only using the pixel values of neighboring blocks in a row immediately above the current block according to an inverse process to the spatial prediction used for generation of the bitstream. In an embodiment, spatially predicted pixel values in every predetermined row unit of an image are compensated for. In such an embodiment, in operation 804, pixel values that are spatially predicted after replacing pixel values of neighboring blocks in a row immediately above every predetermined row unit with a predetermined reference value (e.g., an intermediate gray scale among gray scales of the image) are compensated for.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, according to an embodiment of the present invention, pipeline processing is possible with spatial prediction, thereby achieving real-time encoding and decoding.

In particular, by using a system, medium, and method for spatial prediction of image data and a corresponding system, medium, and method encoding image data, error diffusion can be prevented during spatial prediction with respect to an edge of an image, thereby making it possible to avoid display quality degradation.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A system to spatially predict image data, the system comprising:
   a spatial prediction unit configured to spatially predict pixel values of a current block by using the pixel values of neighboring blocks in a row immediately above the current block, which are replaced by a predetermined reference value,
   wherein the spatial prediction unit comprises a pixel value replacement processor configured to replace the pixel values of blocks in the row immediately above the current block among neighboring blocks that are spatially adjacent to the current block of an image with a predetermined reference value at every predetermined rows.

2. The system of claim 1, further comprising:
   a pixel value filtering unit to filter the pixel values of the neighboring blocks in the row immediately above the current block; and
   a prediction mode determination unit to determine a corresponding spatial prediction mode for the current block using the pixel values of the neighboring blocks in the row immediately above the current block and the filtered pixel values.

3. The system of claim 2, wherein the pixel value filtering unit detects an average of pixel values of pixels adjacent to an arbitrary pixel having an arbitrary pixel value among the pixel values of the neighboring blocks in the row immediately above the current block as a filtered value of the arbitrary pixel value.

4. The system of claim 2, wherein the prediction mode determination unit determines a spatial prediction direction having a minimum sum of differential values between the pixel values of the neighboring blocks in the row immediately above the current block and the pixel values of the current block and a minimum sum of differential values between the filtered pixel values and the pixel values of the current block to be the spatial prediction mode for the current block.

5. The system of claim 4, wherein the spatial prediction direction is one of a vertical direction, a diagonal down-right direction, and a diagonal down-left direction.

6. The system of claim 5, wherein the spatial prediction mode comprises one of a first prediction mode for prediction using the filtered pixel values of the neighboring blocks in the row immediately above the current block in the vertical direction, a second prediction mode for prediction using the original pixel values of the neighboring blocks that are not filtered in the vertical direction, a third prediction mode for prediction using the filtered pixel values of the neighboring blocks in the row immediately above the current block in the diagonal down-right direction, and a fourth prediction mode for prediction using the filtered pixel values of the neighboring blocks in the row immediately above the current block in the diagonal down-left direction.

7. The system of claim 1, wherein an intermediate gray scale among gray scales of the image is set as a predetermined reference value.

8. The system of claim 1, wherein the spatial prediction unit performs spatial prediction on pixel values according to the pixel values being of a one-dimensional block.

9. The system of claim 1, wherein the spatial prediction unit performs spatial prediction on pixel values according to the pixel values being of a two-dimensional block.

10. A system for encoding image data, the system comprising:
   a spatial prediction unit configured to spatially predict pixel values of a current block of an image using neighboring blocks in a row immediately above the current block among neighboring blocks that are spatially adjacent to the current block;
   a transformation and quantization unit configured to transform and quantize the spatially predicted pixel values; and
   a bitstream generation unit configured to generate a bitstream corresponding to the transformed and quantized pixel values,
   wherein the spatial prediction unit performs spatial prediction based on a replacing of pixel values of neighboring blocks in respective rows immediately above a respective current block every predetermined row unit within the respective current block with respective predetermined reference values.

11. The system of claim 10, further comprising:
a pixel value filtering unit to filter the pixel values of the neighboring blocks in the row immediately above the current block; and
a prediction mode determination unit to determine a corresponding spatial prediction mode for the current block using the pixel values of the neighboring blocks in the row immediately above the current block and the filtered pixel values.

12. The system of claim 11, wherein the pixel value filtering unit detects an average of pixel values of pixels adjacent to an arbitrary pixel having an arbitrary pixel value among the pixel values of the neighboring blocks in the row immediately above the current block as a filtered value of the arbitrary pixel value.

13. The system of claim 11, wherein the prediction mode determination unit determines a spatial prediction direction having a minimum sum of differential values between the pixel values of the neighboring blocks in the row immediately above the current block and the pixel values of the current block and a minimum sum of differential values between the filtered pixel values and pixel values of the current block to be the spatial prediction mode for the current block.

14. The system of claim 13, wherein the spatial prediction direction is one of a vertical direction, a diagonal down-right direction, and a diagonal down-left direction.

15. The system of claim 14, wherein the spatial prediction mode comprises one of a first prediction mode for prediction using the filtered pixel values of the neighboring blocks in the row immediately above the current block in the vertical direction, a second prediction mode for prediction using the original pixel values of the neighboring blocks that are not filtered in the vertical direction, a third prediction mode for prediction using the filtered pixel values of the neighboring blocks in the row immediately above the current block in the diagonal down-right direction, and a fourth prediction mode for prediction using the filtered pixel values of the neighboring blocks in the row immediately above the current block in the diagonal down-left direction.

16. The system of claim 10, wherein an intermediate gray scale among gray scales of the image is set as a predetermined reference value.

17. The system of claim 10, wherein the spatial prediction unit performs spatial prediction on pixel values according to the pixel values being of a one-dimensional block.

18. The system of claim 10, wherein the spatial prediction unit performs spatial prediction on pixel values according to the pixel values being of a two-dimensional block.

19. A system for spatial prediction compensation of image data, the system comprising:
a spatial prediction compensation unit configured to compensate for spatially predicted pixel values using the recognized predetermined reference values,
wherein the spatial prediction compensation unit comprises a reference value recognition processor configured to recognize a predetermined reference value that replaces pixel values, at every predetermined rows, of blocks in a row immediately above a current block among neighboring blocks that are spatially adjacent to the current block of an image.

20. A system for decoding image data, the system comprising:
a bitstream decoding unit configured to decode a bitstream of the image data;
an inverse quantization and inverse transformation unit configured to inversely quantize and inversely transform the decoded bitstream; and
a spatial prediction compensation unit configured to compensate for spatially predicted pixel values, of the inversely quantized and inversely transformed decoded bitstream, according to the spatially predicted pixel values having been spatially predicted using neighboring blocks in a row immediately above the current block, among neighboring blocks that are spatially adjacent to the current block, based on a replacing of pixel values of neighboring blocks in respective rows immediately above a respective current block in every predetermined row unit within the respective current block with respective predetermined reference values.

21. A method of spatial prediction of image data, the method comprising spatially predicting pixel values of a current block of an image using neighboring blocks in a row immediately above the current block among neighboring blocks that are spatially adjacent to the current block, wherein the spatial prediction is based on a replacing of pixel values of neighboring blocks in respective rows immediately above a respective current block every predetermined row unit within the respective current block with respective predetermined reference values.

22. The method of claim 21, further comprising:
filtering the pixel values of the neighboring blocks in the row immediately above the current block; and
determining a corresponding spatial prediction mode for the current block using the pixel values of the neighboring blocks in the row immediately above the current block and the filtered pixel values.

23. The method of claim 22, wherein the filtering of the pixel values comprises detecting an average of pixel values of pixels adjacent to an arbitrary pixel having an arbitrary pixel value among the pixel values of the neighboring blocks in the row immediately above the current block as a filtered value of the arbitrary pixel value.

24. The method of claim 22, wherein the determination of the spatial prediction mode comprises determining a spatial prediction direction having a minimum sum of differential values between the pixel values of the neighboring blocks in the row immediately above the current block and the pixel values of the current block and a minimum sum of differential values between the filtered pixel values and the pixel values of the current block to be the spatial prediction mode for the current block.

25. The method of claim 24, wherein the spatial prediction direction is one of a vertical direction, a diagonal down-right direction, and a diagonal down-left direction.

26. The method of claim 25, wherein the spatial prediction mode comprises one of a first prediction mode for prediction using the filtered pixel values of the neighboring blocks in the row immediately above the current block in the vertical direction, a second prediction mode for prediction using the original pixel values of the neighboring blocks that are not filtered in the vertical direction, a third prediction mode for prediction using the filtered pixel values of the neighboring blocks in the row immediately above the current block in the diagonal down-right direction, and a fourth prediction mode for prediction using the filtered pixel values of the neighboring blocks in the row immediately above the current block in the diagonal down-left direction.

27. The method of claim 21, wherein an intermediate gray scale among gray scales of the image is set as a predetermined reference value.

28. The method of claim 21, wherein the spatial prediction of the pixel values of the current block comprises performing spatial prediction on pixel values of a one-dimensional block.

29. The method of claim 21, wherein the spatial prediction of the pixel values of the current block comprises performing spatial prediction on pixel values of a two-dimensional block.

30. At least one non-transitory computer readable medium comprising computer readable code to control at least one processing element to implement the method of claim 21.

31. A method of encoding image data, the method comprising:
spatially predicting pixel values of a current block of an image using neighboring blocks in a row immediately above the current block among neighboring blocks that are spatially adjacent to the current block;
transforming and quantizing the spatially predicted pixel values; and
generating a bitstream corresponding to the transformed and quantized pixel values,
wherein the spatial prediction is based on a replacing of pixel values of neighboring blocks in respective rows immediately above a respective current block every predetermined row unit within the respective current block with respective predetermined reference values.

32. The method of claim 31, further comprising:
filtering the pixel values of the neighboring blocks in the row immediately above the current block; and
determining a corresponding spatial prediction mode for the current block using the pixel values of the neighboring blocks in the row immediately above the current block and the filtered pixel values.

33. The method of claim 32, wherein the filtering of the pixel values comprises detecting an average of pixel values of pixels adjacent to an arbitrary pixel having an arbitrary pixel value among the pixel values of the neighboring blocks in the row immediately above the current block as a filtered value of the arbitrary pixel value.

34. The method of claim 32, wherein the determination of the spatial prediction mode comprises determining a spatial prediction direction having a minimum sum of differential values between the pixel values of the neighboring blocks in the row immediately above the current block and the pixel values of the current block and a minimum sum of differential values between the filtered pixel values and the pixel values of the current block to be the spatial prediction mode for the current block.

35. The method of claim 34, wherein the spatial prediction direction is one of a vertical direction, a diagonal down-right direction, and a diagonal down-left direction.

36. The method of claim 35, wherein the spatial prediction mode comprises one of a first prediction mode for prediction using the filtered pixel values of the neighboring blocks in the row immediately above the current block in the vertical direction, a second prediction mode for prediction using the original pixel values of the neighboring blocks that are not filtered in the vertical direction, a third prediction mode for prediction using the filtered pixel values of the neighboring blocks in the row immediately above the current block in the diagonal down-right direction, and a fourth prediction mode for prediction using the filtered pixel values of the neighboring blocks in the row immediately above the current block in the diagonal down-left direction.

37. The method of claim 31, wherein an intermediate gray scale among gray scales of the image is set as a predetermined reference value.

38. The method of claim 31, wherein the spatial prediction of the pixel values of the current block comprises performing spatial prediction on pixel values of a one-dimensional block.

39. The method of claim 31, wherein the spatial prediction of the pixel values of the current block comprises performing spatial prediction on pixel values of a two-dimensional block.

40. At least one non-transitory computer readable medium comprising computer readable code to control at least one processing element to implement the method of claim 31.

41. A method of spatial prediction compensation of image data, the method comprising compensating for spatially predicted pixel values according to the spatially predicted pixel values having been spatially predicted using neighboring blocks in a row immediately above the current block, among neighboring blocks that are spatially adjacent to the current block, based on a replacing of pixel values of neighboring blocks in respective rows immediately above a respective current block in every predetermined row unit within the respective current block with respective predetermined reference values.

42. At least one non-transitory computer readable medium comprising computer readable code to control at least one processing element to implement the method of claim 41.

43. A method of decoding image data, the method comprising:
decoding a bitstream of the image data;
inversely quantizing and inversely transforming the decoded bitstream; and
compensating for spatially predicted pixel values, of the inversely quantized and inversely transformed decoded bitstream, according to the spatially predicted pixel values having been spatially predicted using neighboring blocks in a row immediately above the current block, among neighboring blocks that are spatially adjacent to the current block, based on a replacing of pixel values of neighboring blocks in respective rows immediately above a respective current block in every predetermined row unit within the respective current block with respective predetermined reference values.

44. At least one non-transitory computer readable medium comprising computer readable code to control at least one processing element to implement the method of claim 43.

* * * * *